July 30, 1957  S. J. KOPEC  2,800,721
GEAR CHECKING MACHINE
Filed Dec. 8, 1952  2 Sheets-Sheet 1

STANLEY J. KOPEC, Inventor

By Charles L. Loverchek
Attorney

July 30, 1957  S. J. KOPEC  2,800,721
GEAR CHECKING MACHINE
Filed Dec. 8, 1952  2 Sheets-Sheet 2

INVENTOR
STANLEY J. KOPEC
BY Charles S. Lovercheck
ATTORNEY

United States Patent Office 2,800,721
Patented July 30, 1957

2,800,721

GEAR CHECKING MACHINE

Stanley J. Kopec, Northville, Mich.

Application December 8, 1952, Serial No. 324,680

4 Claims. (Cl. 33—179.5)

This invention relates to gauges and more particularly to gauges for checking the curvature of gear teeth.

In the manufacture of gearing, it is necessary to be able to correctly inspect the various gear elements. One of the most important of the elements to be checked is the involute curve of the gear tooth.

The distortion of involute curves occurs in ordinary production from many causes but commonly from improperly sharpened gear cutting tools and torsional strains set up during the cutting procedure of forming the gear tooth.

To determine the nature and amount of error in the involute curve so that proper correction can be made, an involute profile measuring machine is required. In order to check an involute curve to one-ten thousandths inch, it is necessary to know that the method of checking or the equipment used does not introduce any errors that will confuse the readings. An instrument which is simple as well as accurate is required. Machines which were made prior to the present invention for checking the involute curve of gear teeth were complicated and did not retain their accuracy. Furthermore, it was difficult for an ordinary mechanic to understand the operation of the previous machine for checking involute profiles so as to properly adjust them.

It is, accordingly, an object of this invention to provide a machine which will be simple in construction and accurate in operation.

It is another object of the invention to provide a machine wherein a pointer on a dial indicator will remain at a fixed point as long as the curvature of the gear tooth being measured is correct and the pointer will deviate from the fixed position as soon as an inaccuracy in the gear tooth is detected by the instrument.

Another object of the invention is to provide a machine for checking the curvature of gear teeth which will be simple in operation, economical in manufacturing cost, and the operation of which can be readily understood by an ordinary mechanic.

It is another object of the invention to provide a gear checking machine which will check any point on a given gear tooth to an accuracy of .0001 inch.

Another object of the present invention is to provide a gear checking machine wherein a dial indicator is moved through the path defining an involute to follow a tooth profile.

Other objects and advantages of the present invention will appear to those skilled in the art from a study of the drawings and the appended specification and claims, wherein Fig. 1 is a top view of an involute profile measuring machine according to the invention;

Figure 1:
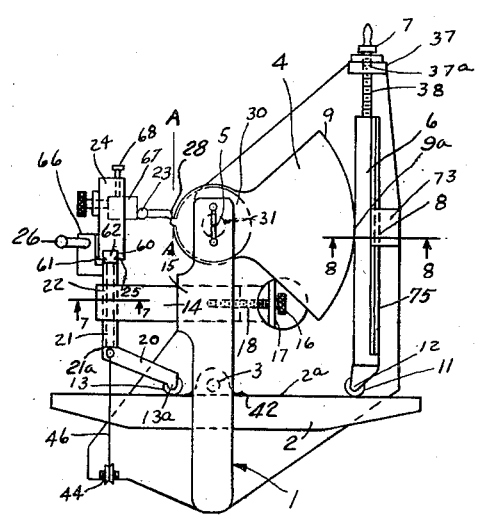
Figure 4:
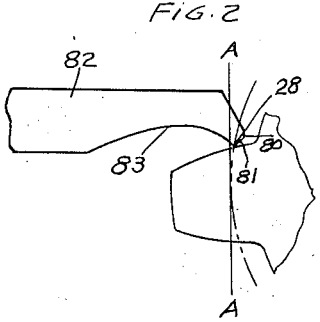
Figure 5:
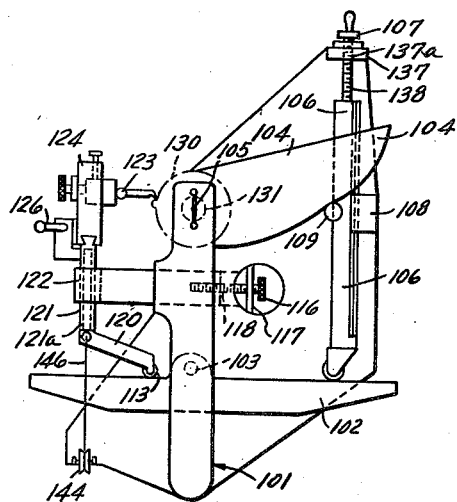
Figure 6:
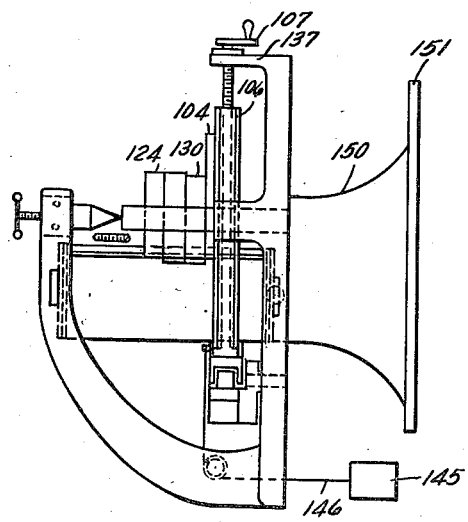
Figure 7:
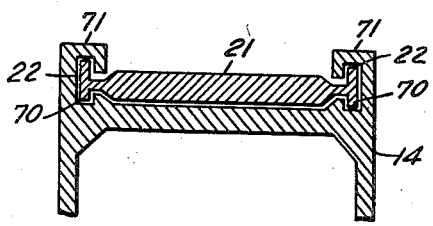

Fig. 4 discloses an enlarged view of a pointer for attachment to a dial indicator according to the invention;

Figs. 5 and 6 disclose another embodiment of the invention wherein a constant rise cam is substituted for the master base circle and slide plate;

Fig. 7 is a cross sectional view taken on line 7—7 of Fig. 1; and

Figure 8:
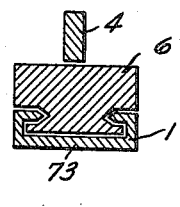

Fig. 8 is a cross sectional view taken on line 8—8 of Fig. 1.

With more particular reference to the drawings, Fig. 1 shows an involute profile measuring machine having a frame 1 to which is pivoted a ratio bar 2 at 3 and a master base circle plate 4 pivoted to the frame 1 at 5. The pivot point 5 is centered directly in alignment with the pivot point 3. This is important to the operation of the machine. The slide bar 6 is operated by a crank 7 to move in channel members or ways 8. The master base circle plate 4 is rotated about center 5 when the vertical slide is moved upwardly and downwardly by the frictional forces between the edge 9 of the master circle plate against the vertical slide 6. Slide 6 is supported on frame 1 by means of bracket 73 having channel members 8 secured thereto which cooperate with webs 75 on slide 6 to guide slide 6 on frame 1. A follower wheel 11 rests on the upper edge of the ratio bar 2. The center 12 of the follower 11 is disposed on a line through the point of contact 9a between the base circle 4 and the slide 6. This line is perpendicular to a line through center 5 and contact point 9a. The line through center 5 and contact point 9a is perpendicular to a line through center 5 and center 3. The follower wheel 13 is adjusted along the edge of the ratio bar 2 by means of the slide 14 which is moved in ways 15 in the frame 1 by means of knob 16 which is rotatably held against axial movement in plate 17 and has a lead screw 18 which engages the slide 14 to move it horizontally, thereby adjusting the distance between the center 13a of the follower 13 and a line through the centers 5 and 3 to a distance equal to the radius of the base circle of the gear to be checked. The point 28 of indicator 23 is maintained at a distance from a line through center 5 and center 3 equal to the distance of the center 13a of follower 13 from the same line.

The follower 13 is rotatably connected to bracket 20 and bracket 20 is fixedly secured to arm 21 at 21a by welding or other suitable means. The bracket 20 is supported by slide 14 by means of slots 70 in the edge of the slide 14 which engage ways 22 in arm 21. A dial indicator 23 is carried on plate 24 and plate 24 is movable laterally on ways 25 by crank 26 which operates a lead screw in a nut. The nut is fixed to the plate 24 in a conventional manner. Plate 24 has dovetailed portions 60 having downwardly extending flanged portions 61 which engage upwardly extending male dovetailed portions 62 on the arm 21. Crank 26 is supported in bracket 66 which is attached to arm 21 and is adapted to adjust the plate 24 along male dovetailed portion 62 on arm 21 so that dial indicator 23 which is supported on plate 24 by bracket 67 can be moved laterally along the gear teeth of gear 30. The dial indicator 23 is attached by means of brackets 67 to a plate 24 and is held in place by a screw 68 or other convenient means. Arm 21 is slidably secured to slide 14 in ways 22 and flange members 71 are adapted to surround the male dovetailed members 70 on arm 21.

The operative tip 28 of the dial indicator 23 is disposed to engage the surface of the gear tooth to be checked. The gear tooth 29 is one of the numerous teeth on the periphery of the tooth of the gear 30 which is fixed on arbor 31 to rotate with the base circle plate 4. The arbor 31 is fixed to the master base circle plate 4 to operate therewith by means of centers 32 and 33. The center 33 is mounted to rotate in an anti-friction bearing 35 in arm 36 of frame 1. Friction between the engaged end of the arbor 31 and the center 32 causes the arbor to rotate. When one tooth has been checked, the gear can be advanced to the next tooth by holding master circle 4 and rotating the arbor 31 relative thereto to bring the next tooth into engagement with indicator 23.

Figure 2:
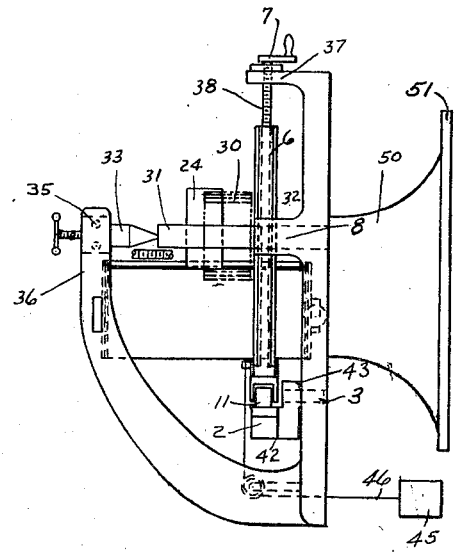
Fig. 2 is a side view of the involute profile measuring machine shown in Fig. 1.

The crank 7 is pivotally mounted in bearing 37 and the lead screw 38 is threadably connected to the slide 6 to move the slide 6 in one direction when the crank 7 is rotated in one direction and to move slide 6 in another direction when crank 7 is rotated in the opposite direction. When the machine is properly adjusted for checking a gear having a given size base circle, the point 28 of the indicator will move on line A—A which will be tangent to the base circle of the gear. The shape of the indicator point is shown in Fig. 2. The distance from the flat surface 80 to the line A—A, which is drawn through the point 28, is made of a known dimension. The surface 80 is utilized as a reference point in setting the machine up for testing a given gear. Since it is difficult for the operator to set his measuring instrument at the point 28, he may measure with his instrument from the surface 80 to a vertical line through the center 5 of the gear and, by adding the known distance from the surface 80 to the line A—A, determine when this distance is equal to the radius of the base circle of the gear, and, thereby, set the indicator point 28 on the base circle of the gear with extreme accuracy. It is extremely important in the operation of the machine that this setting be made with extreme accuracy. The indicator point has a rigid body 82 and an arcuate curved under surface 83 terminating in point 28. This particular shape of point makes it possible to accurately locate the point 28 on the base circle of the gear. The angle between surfaces 81 and 83 may be any suitable angle to give sufficient strength to the point.

The ratio bar 2 will rock about center 3 when slide 6 and follower 11 move ratio bar 2 about center 3 and the follower 13 will move in proportion to the movement of the follower 11. The dial indicator 23 will be moved in proportion to the movement of the follower 11 since dial indicator 23 is fixed to move with arm 21. The movement of any point on a gear tooth 29 will be proportional to the movement of any point on the surface 9 of the master base circle 4 since the ratio of the distance 12—3 to the distance 13—3 is proportional to the ratio of the distance 5—9 to the radius of the base circle 4 of the gear being checked.

From the foregoing, it will be seen that any point on the surface 9 of the master base plate 4 will move through an arc centered on the center 5 equal to the vertical displacement of a point on the slide 6 and a point on the tooth 29 will move in an arc centered about the center 5 and equal to the vertical displacement of the dial indicator 23 for a given number of rotations of the crank 7. In other words, the relative movement of the indicator and the gear tooth is proportional to the relative movement of the master base circle and the slide and since the master base circle represents a circle rolling on the slide, the relative movement of a point on the master circle to a point on the slide describes an involute curve and the relative movement of the tip of the dial indicator to the gear tooth describes an involute curve along the surface of the gear tooth because the movement of the slide is always proportional to the movement of slide which carries the indicator. Therefore, the dial of the indicator will constantly read zero if the surface of the tooth is a true involute.

Figure 3:
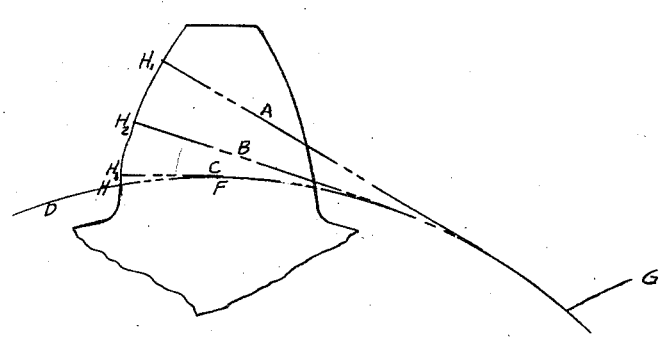
Fig. 3 is a geometrical construction of an involute shaped gear tooth.

An involute curve is formed by any point on a flexible inextensible member kept taut as it is wound or unwound from a circular cylinder. In gear construction, the tooth profile is defined by unrolling a flexible member from a cylinder having the diameter of the diameter of the base circle of the gear. Fig. 3 shows a base circle G and tangent lines A, B, and C tangent to the base circle representing various positions of a flexible member moved about the base circle G. When the flexible member shown in positions A, B, and C is unrolled from the base circle, point H on the flexible member will travel through points $H^1$, $H^2$, and $H^3$ which is an involute curve.

Another way to visualize the construction of an involute curve is to consider the base circle G of the gear in Fig. 3 and a thread D wrapped around the base circle. If a point H is held on the thread D and the thread unwound from the base circle G, the point H will pass through points $H^3$, $H^2$, and $H^1$ generating the involute curve shown. If we consider the base circle plate 4 in Fig. 1 as the circle and the slide 6 as a plane, the base circle 4 rolls on plane 6. The relative movement of any point on base circle 4 with regard to any point on the slide 6 defines an involute movement. The movement of the dial indicator with regard to the base circle of the gear is proportional to the movement of the slide 6 with regard to the master circle 4. The point of the indicator will describe an involute and follow the involute curve of the gear profile when the gear is rotated by the arbor to which the base circle 4 is fixed since the distance between the center of follower 13 and center 3 is equal to the radius of the base circle of the gear. In order to accomplish the checking of a particular gear, the spacing between the center of follower 13 and the center 3 must be exactly equal to the radius of the base circle of the gear being checked.

The ratio bar is offset at 42 from the ratio bar portion 43 which engages the center 3 thereof.

Figs. 5 and 6 show another embodiment of the invention. The ratio bar, machine frame, adjusting mechanisms, and all other parts of the machine shown in Figs. 5 and 6 correspond to the parts of the machine shown in Figs. 1 to 4 inclusive, each corresponding numeral having one hundred added to it. However, in this embodiment of the invention, the constant rise cam 104 is substituted for the base circle 4 and the follower 109 is attached to slide 106. The contour of the cam 104 is designed so that the vertical displacement of any point on the slide 106 will be equal to the length of arc through which a point on the cam will move when the point is selected a radial distance from the center 105 equal to the distance from the center 105 to a line drawn through the center of follower 109 and parallel to a line drawn through the centers of pivot points 105 and 103. Inasmuch as the movement of the slide 6 in Figs. 1 and 2 is a constant ratio to the angular movement of any point on the base plate 4 about center 5, a similar movement will be accomplished by the use of the constant rise cam 104 shown in Figs. 5 and 6. The movement of the dial indicator 123 with regard to the gear 130 will be an involute and the dial indicator will indicate zero when the machine disclosed in Figs. 5 and 6 is set up in accordance with the previous discussion of the machine shown in Figs. 1 and 2.

The embodiment of the machine shown in Figs. 1 and 2 is provided with a base 50 and a floor engaging plate 51 while the embodiment of the machine shown in Figs. 5 and 6 is provided with a base 150 with a floor engaging plate 151. The follower 13 is held in engagement with the ratio bar 2 in the embodiment of the machine shown in Figs. 1 and 2 by means of the cable 46 which is attached to the arm 21 and passes over the pulley 44 and supports the weight 45. In the embodiment of the machine shown in Figs. 5 and 6, a corresponding function is accomplished by the cable 146 which passes over the pulley 144 and supports the weight 145.

In checking gear teeth, the machine is used in the following manner: The radius of the curve is determined by the center of the follower 113 and center 103 which are set from each other a distance exactly equal to the radius of the base circle of the gear to be checked. Plate 124 is moved by means of crank 126 to engage the gear tooth to be checked; that is, along one edge in the central portion or at the other edge. The pointer of the dial indicator is then set at zero. The gear is then rotated by operating crank 107 to move slide 106 which in turn causes ratio bar 102 to rotate about center 103 and thereby causes arm 121 which carries plate 124 which in turn carries the dial indicator and thereby moves the dial indicator as the gear rotates. Since the gear rotates in a clockwise direction, the dial indicator moves at the same rate that the gear tooth moves so that the needle on the dial indicator continues to indicate zero throughout the entire movement of slide 106.

All bearing surfaces are shown by way of illustration and must be constructed to operate with a minimum clearance to enhance the accuracy of the machine.

From the foregoing, it will be apparent to those skilled in the art that I have provided a gear checking machine for checking the involute curve on gears which is simple in construction, which will give extremely accurate results, and which is convenient to operate.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. An involute checking machine comprising a frame, a master base circle plate rotatably supported on said frame and having a curved peripheral surface, means to attach a gear to said master circle plate to rotate about a common axis therewith, a ratio bar swingably mounted on said frame and swingable about an axis parallel to and spaced from said axis about which said master circle plate rotates, a slide bar operatively engaging said peripheral surface of said base circle plate, means on said frame to constrain said slide bar to move in a path parallel to a line drawn through said axis of said master circle plate and said axis of said ratio bar, one end of said slide bar having means thereon engaging said ratio bar on a line parallel to said path of movement of said slide bar and passing through the position where said slide bar engages said master circle plate, an arm supported on said machine, and means on said frame to constrain said arm to move in a path parallel to the path of movement of said slide bar, said arm having means thereon engaging said ratio bar, said base circle plate, slide bar, and arm being disposed in alignment with each other, said pivotal connection of said ratio bar being disposed between said arm and said slide bar, said arm means and said slide bar means engaging said ratio bar on a line perpendicular to said axis of said ratio bar, said arm having indicating means thereon, said indicating means having a member thereon extending from said arm toward said gear and an operative tip on said member extending therefrom toward said ratio bar and engaging a point on a tooth of said gear, said gear tooth being checked disposed between said member and said ratio bar, said tip being disposed on a line parallel to said path of movement of said arm and through said location where said arm engages said ratio bar.

2. The machine recited in claim 1 wherein said arm is supported on said frame by an arm supporting slide member, said arm supporting slide member being adjustably movable on said frame to move said arm and thereby vary the distance of said arm from said axis of rotation of said gear.

3. The machine recited in claim 2 wherein indicating means is supported on said arm by means adjustably movable thereon in a path parallel to said axis of rotation of said gear.

4. The machine recited in claim 1 wherein said ratio bar has a surface on the side thereof adjacent to said base circle plate, said arm means engaging said ratio bar being movable along said surface into a plane passing through said axis of rotation of said ratio bar and parallel to said axis of rotation of said ratio bar and said axis of rotation of said base circle plate.

References Cited in the file of this patent

UNITED STATES PATENTS

| | | |
|---|---|---|
| 1,304,592 | Olson | May 27, 1919 |
| 1,564,589 | Laessker | Dec. 8, 1925 |
| 1,567,134 | Gosnell | Dec. 29, 1925 |
| 1,680,563 | Miller | Aug. 14, 1928 |
| 1,994,256 | Simmons | Mar. 12, 1935 |
| 2,013,365 | Snarry | Sept. 3, 1935 |
| 2,171,589 | Miller | Sept. 5, 1939 |
| 2,268,342 | Osplack | Dec. 30, 1941 |
| 2,305,264 | Leonard | Dec. 15, 1942 |
| 2,381,975 | Ernst | Aug. 14, 1945 |
| 2,533,522 | Sisson | Dec. 12, 1950 |
| 2,607,123 | Sheridan | Aug. 19, 1952 |
| 2,632,955 | Samuelson | Mar. 31, 1953 |
| 2,673,401 | Bradner | Mar. 30, 1954 |